(12) United States Patent
Grenga (10) Patent No.: US 7,895,817 B2
(45) Date of Patent: Mar. 1, 2011

(54) TOOL-LESS CHAIN COUPLING LINK (75) Inventor: Todd Grenga, Cumberland, RI (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 118 days.

(21) Appl. No.: 12/454,235

(22) Filed: May 14, 2009

(65) Prior Publication Data

US 2010/0287904 A1 Nov. 18, 2010

(51) Int. Cl.
*F16G 15/04* (2006.01)
(52) U.S. Cl. .................... 59/85; 59/87; 59/89
(58) Field of Classification Search ............. 59/78, 59/84, 85, 86, 87, 88, 89, 93; 24/599.9
See application file for complete search history.

(56) References Cited

U.S. PATENT DOCUMENTS

| 697,630 | A | * | 4/1902 | Kilgore | 59/89 |
|---|---|---|---|---|---|
| 1,688,176 | A | * | 10/1928 | Clark | 59/88 |
| 1,998,406 | A | * | 4/1935 | Gouverneur | 59/85 |
| 2,216,831 | A | * | 10/1940 | Robbins | 59/85 |
| 2,353,940 | A | | 7/1944 | Staats | |
| 3,132,395 | A | | 5/1964 | Luketa | |
| 3,974,640 | A | | 8/1976 | Schreyer | |
| 4,063,413 | A | | 12/1977 | Benton | |
| 4,123,900 | A | | 11/1978 | Sadowski | |
| 4,134,256 | A | | 1/1979 | Fredriksson | |
| 4,280,728 | A | | 7/1981 | Fredriksson | |
| 4,418,526 | A | | 12/1983 | Clement | |
| 4,554,712 | A | * | 11/1985 | Le Beon | 24/599.9 |
| 4,590,758 | A | | 5/1986 | Hannig | |
| 5,732,545 | A | | 3/1998 | Fredriksson | |
| 5,775,754 | A | | 7/1998 | Fredriksson | |
| 5,851,040 | A | | 12/1998 | Fredriksson | |
| 6,023,927 | A | * | 2/2000 | Epstein | 59/86 |
| 7,269,937 | B2 | | 9/2007 | Fredriksson | |

* cited by examiner

*Primary Examiner*—David B Jones
(74) *Attorney, Agent, or Firm*—Vin Ranucci (57) ABSTRACT

A tool-less chain coupling link has first and second body members releasably joined together. A first hinge pin is movably positioned within corresponding openings in the first and second body members. A first hinge pin keeper member is pivotally attached to the first body member and movably attached to the first hinge pin. A second hinge pin is movably positioned within other corresponding openings in the first and second body members. A second hinge pin keeper member is pivotally attached to the second body member and movably attached to the second hinge pin. The first and second hinge pin keeper members can be pivoted in a first direction to withdraw the first and second hinge pins, respectively, a sufficient distance to allow the first and second body members to be released from each other. The first and second hinge pin keeper members can be pivoted in an opposite, second direction so as to position the first and second hinge pins within their corresponding openings in the first and second body members so that the first and second body members are releasably joined together.

22 Claims, 4 Drawing Sheets

TOOL-LESS CHAIN COUPLING LINK

STATEMENT OF GOVERNMENT INTERESTS

The invention described herein may be manufactured and used by the U.S. Government for Governmental purposes without the payment of any royalty thereon.

TECHNICAL FIELD

The present invention generally relates to a tool-less chain coupling link.

BACKGROUND ART

In helicopter sling loading, sling leg length is partially controlled by adding or removing pre-designated lengths of chains. A coupling link is used to connect the additional chains. One example of a prior art chain coupling link is the Columbus McKinnon Hammerlok Model No. 664241. A major disadvantage of the aforesaid prior art coupling link is that a hammer and punch are needed to separate the coupling link sections. During testing, it is common to repeatedly change the chains from one test item to the next or even while on a single item. This is usually done outdoors with no work bench nearby. The test requires two people to perform the change. One person holds the coupling link steady while the other person lines up the punch with the hinge pin. The second person then drives the punch through with the hammer. This also requires clearance below the coupling link to permit hinge pin movement. Often, the first person is trying to hold the link off the ground. Other situations have occurred where the sling sets have been taken to the load already positioned for flight only to find that the additional chains have not been connected. This requires a return trip to the work shop to retrieve the hammer and punch thereby resulting in expenditure of even more time.

Other prior art chain coupling links are disclosed in U.S. Pat. Nos. 2,353,940, 3,132,395, 3,974,640, 4,063,413, 4,123,900, 4,134,256, 4,280,728, 4,418,526, 4,590,758, 5,732,545, 5,775,754, 5,851,040 and 7,269,937.

What is needed is an improved chain coupling link.

DISCLOSURE OF THE INVENTION

The present invention is directed to a tool-less chain coupling link that eliminates the problems and disadvantages of prior art chain coupling links. The tool-less chain coupling link of the present invention significantly reduces the time for installing and removing additional chain sets.

The tool-less chain coupling link of the present invention comprises two coupling link body members that are removably joined together by two hinge pins. Each hinge pin is movably secured to both coupling link body members so as to hold the coupling link body members together as a single unit. Each coupling link body member has a movable hinge pin keeper member that, when in a first position, retains each respective hinge pin in a locked position. Each hinge pin keeper member may be moved to a second position to withdraw the corresponding hinge pin. Each hinge pin is sized so it survives the shear loading produced by the chain's axial loads. Each hinge pin has a predetermined length to enable the hinge pin to be withdrawn a sufficient distanced to allow the coupling link body members to be separated.

Thus, in aspect, the present invention is directed to a tool-less chain coupling link comprising a first generally U-shaped body member having a first end portion and a second forked end portion having a pair of sections separated by a space. The first end portion has an opening and each section of the second forked end portion has an opening, wherein the openings of the sections are substantially coaxial. The tool-less chain coupling link further includes a second generally U-shaped body member releasably joined to the first generally U-shaped body member. The second generally U-shaped body member has a first end portion and a second forked end portion having a pair of sections separated by a space. The first end portion of the second generally U-shaped body member has an opening and each section of the second forked end portion of the second generally U-shaped body member has an opening. The openings in the sections of the second forked end portion of the second generally U-shaped body member are substantially coaxial. The first end portion of the first generally U-shaped body member is positioned in the space between the sections of the second forked end portion of the second generally U-shaped body member such that the openings in the first end portion of the first generally U-shaped body member are substantially aligned with the openings in the sections of the second forked end portion of the second generally U-shaped body member. The first end portion of the second generally U-shaped body member is positioned in the space between the sections of the second forked end portion of the first generally U-shaped body member such that the openings in the first end portion of the second generally U-shaped body member are substantially aligned with the openings in the sections of the second forked end portion of the first generally U-shaped body member. A first hinge pin is removably inserted into the openings of the sections of the second forked end portion of the first generally U-shaped body member and into the opening in the first end portion of the second generally U-shaped body member. A first hinge pin keeper member is pivotally attached to the first generally U-shaped body member and is movably connected to the first hinge pin. The first hinge pin keeper member is pivotal to a first position to withdraw the first hinge pin from the opening in the first end section of the second generally U-shaped body member and to a second position that retains the first hinge pin within the opening of the first end portion of the second generally U-shaped body member and within the openings in the sections of the second forked end portion of the first generally U-shaped member. A second hinge pin member is removably inserted into the openings of the sections of the second forked end portion of the second generally U-shaped body member and the opening in the first end portion of the first generally U-shaped body member. A second hinge pin keeper member is pivotally attached to the second generally U-shaped body member and movably connected to the second hinge pin. The second hinge pin keeper member is pivotal to a first position to withdraw the second hinge pin from the opening in the first end portion of the first generally U-shaped body member and to a second position that retains the second hinge pin within the opening of the first end portion of the first generally U-shaped body member and within the openings in the sections of the second forked end portion of the second generally U-shaped member. When the first and second hinge pin keeper members are both pivoted to the first position, the first and second hinge pins are withdrawn a sufficient distance from the openings in the first and second body members to allow the first and second U-shaped body members to be separated from each other.

Advantages and further features of the present invention are described in the ensuing description.

BRIEF DESCRIPTION OF THE DRAWINGS

Although the scope of the present invention is much broader than any particular embodiment, a detailed description of the preferred embodiment follows together with illustrative figures, wherein like reference numerals refer to like components, and wherein.

Figure 1:
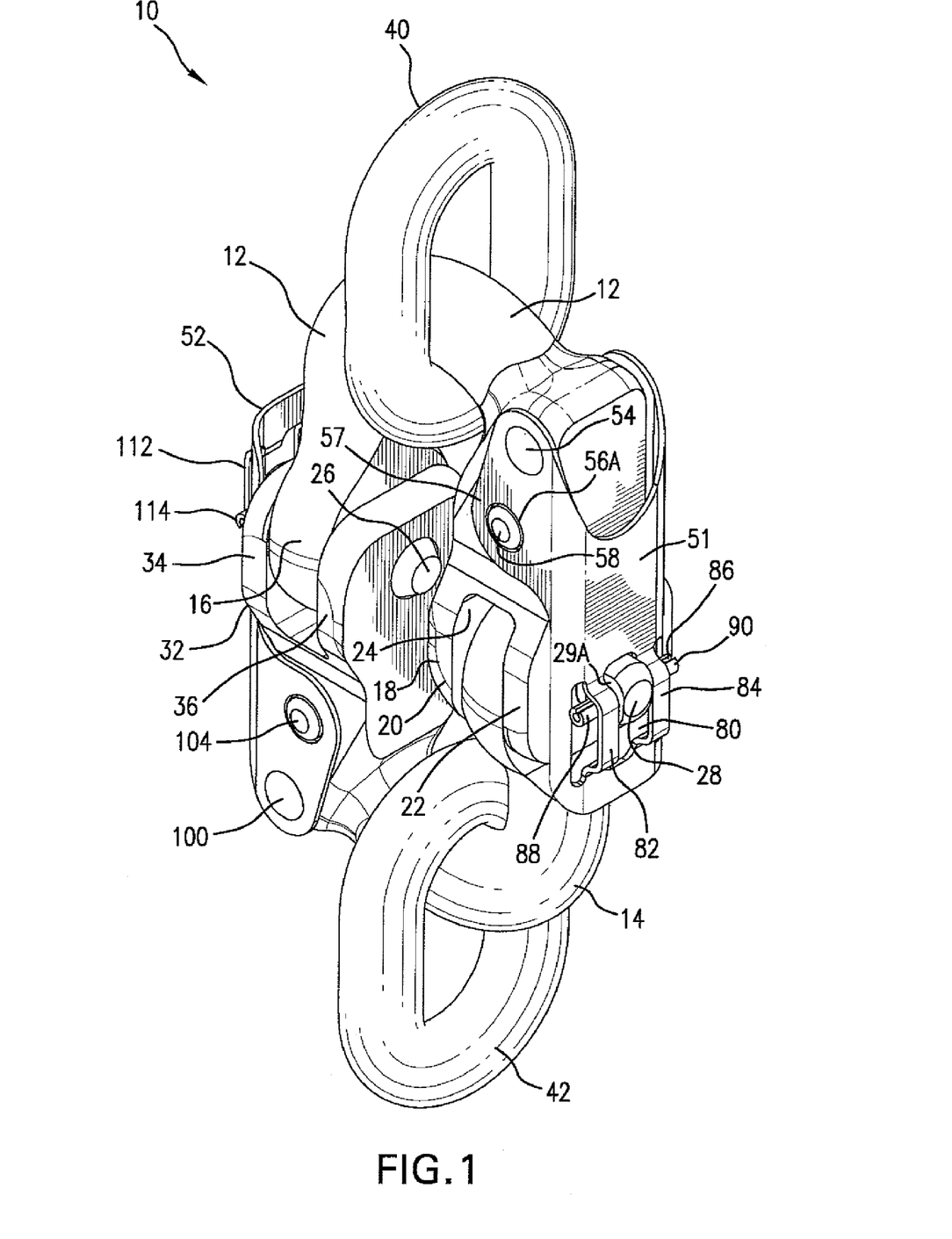
FIG. 1 is a perspective view, in elevation, of the tool-less chain coupling link of the present invention.
Figure 2:
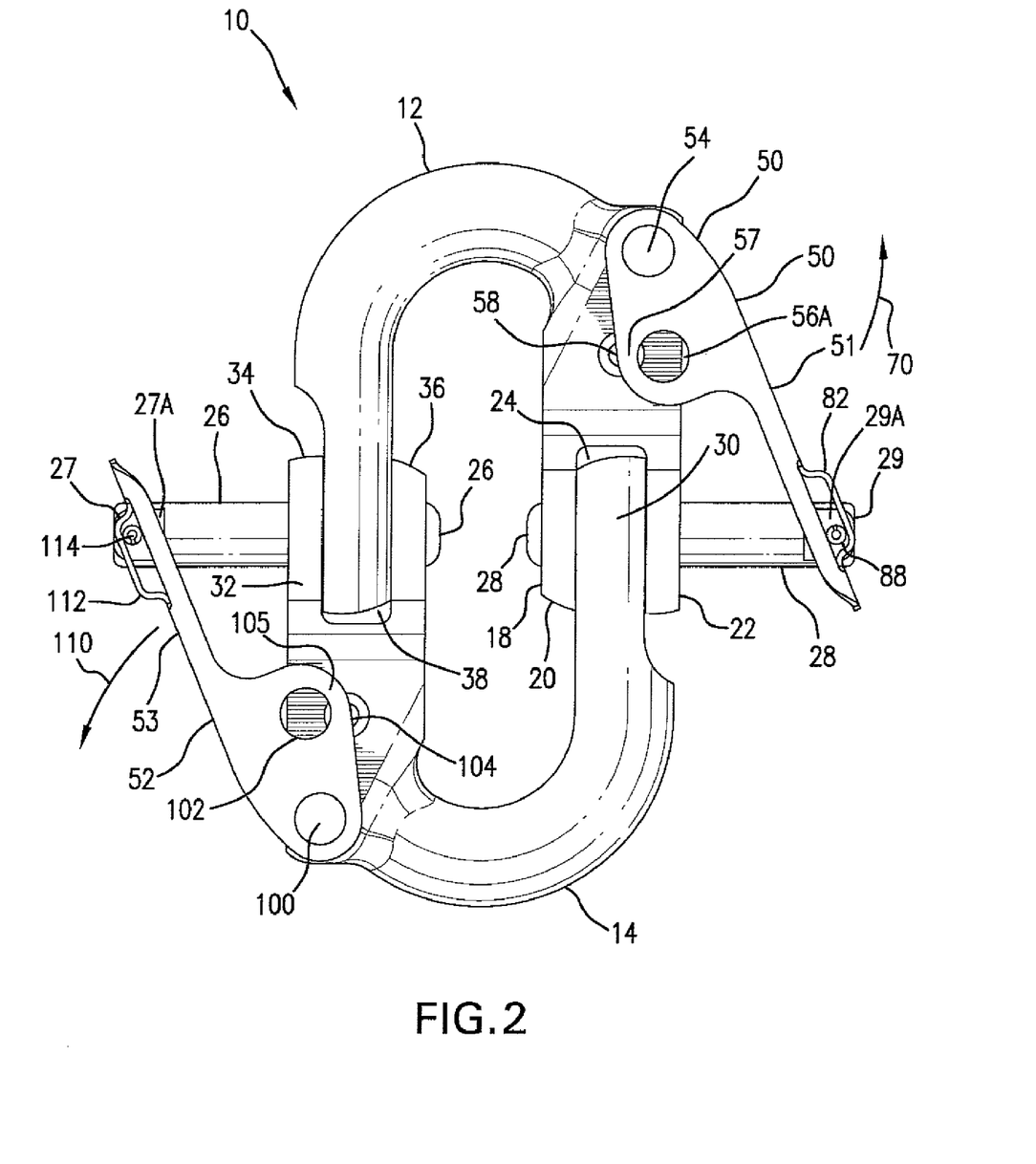
FIG. 2 is a side view, in elevation, of the tool-less coupling link with the hinge pins in a withdrawn configuration.

BEST MODE FOR CARRYING OUT THE INVENTION:

Referring to FIGS. 1 and 2, there is shown tool-less chain coupling link 10 of the present invention. Tool-less chain coupling link 10 of the present invention comprises generally U-shaped link body members 12 and 14. Link body members 12 and 14 are sized to interface with the last links of two chain segments 40 and 42, respectively (see FIG. 1). Link body member 12 has end portion 16 and forked end portion 18. Forked end portion 18 has portions 20 and 22 that are spaced apart by space 24. End portion 16 has a bore therein receiving hinge pin 26 (see FIG. 2). Hinge pin 26 is slidably disposed within the bore in end portion 16. Hinge pin 26 has end portion 27 and generally flat side surfaces, one of which being flat surface 27A and the opposite flat surface not being shown. Each portion 20 and 22 of forked end portion 18 has an opening therein to receive hinge pin 28. Hinge pin 28 is slidably disposed within the openings of portions 20 and 22. Hinge pin 28 includes end portion 29 and generally flat side surfaces 29A and 29B.

Referring to FIGS. 1 and 2, link body member 14 has end portion 30 and forked end portion 32. Forked end portion 32 has portions 34 and 36 that are spaced apart by space 38. Portion 30 has a bore (not shown) therein for receiving hinge pin 28. Thus, hinge pin 28 slidably moves through the openings in portions 20 and 22 of forked end portion 18 of link body member 12 and end portion 30 of link body member 14. Each portion 34 and 36 of forked end portion 32 has an opening (not shown) for receiving hinge pin 26. Thus, hinge pin 26 slidably moves through the openings in portions 34 and 36 of forked end portion 32 and the bore or opening in end portion 16 of link body member 12. As shown in FIG. 1, link body member 12 is configured to be engaged to a chain segment 40. Similarly, link body member 14 is configured to be engaged to chain segment 42.

Figure 3:
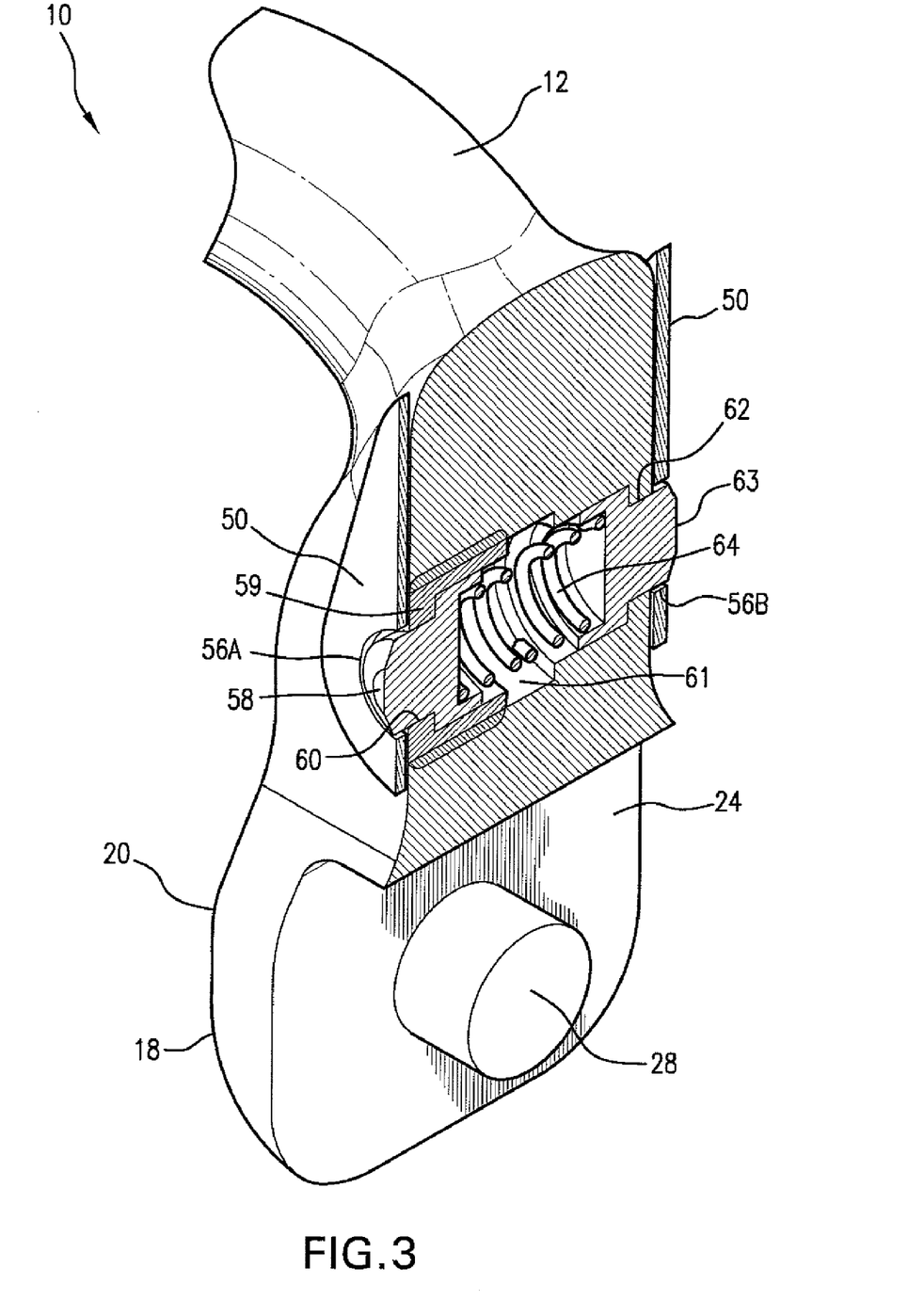
FIG. 3 is a perspective view, in cross-section, of one of the body members of the tool-less chain coupling link of FIG. 1.

Referring to FIGS. 1-3, tool-less chain coupling link 10 further comprises hinge pin keeper members 50 and 52 which are pivotally attached to link body members 12 and 14, respectively. Hinge pin keeper member 50 has outer surface 51. Hinge pin keeper member 50 is pivotally attached to link body member 12 by two rivets, one of which being rivet 54 and the other rivet is not shown but is located on the other side of hinge pin keeper member 50. Hinge pin keeper member 50 includes opening 56A. Link body member 12 includes locking button 58 and locking button cap member 59 (see FIG. 3). Link body member 12 includes opening 60 that is in communication with bore 61. Locking button 58 and locking button cap member 59 are disposed within bore 61. Locking button cap member 59 extends about locking button 58. Locking button cap member 59 retains locking button 58 in place. Bore 61 extends in a direction that is generally orthogonal to the axis of hinge pin 28. Hinge pin keeper member 50 also includes opening 56B that is coaxial with opening 56A. Link body member 12 includes opening 62 that is in communication with bore 61. Opening 62 is sized to receive second locking button 63 that is located on the other side of link body member 12 (see FIG. 3). Each locking button 58 and 63 is urged outward by spring member 64 that is disposed within bore 61 such that locking button 58 protrudes into opening 56A and locking button 63 protrudes into opening 56B. In order to pivot hinge keeper member 50 outward in the direction indicated by arrow 70 (see FIG. 2), a user depresses both locking buttons 58 and 63 and then pulls hinge pin keeper member 50 outward in the direction of arrow 70 so that hinge pin keeper member 50 pivots to an open position. Hinge pin keeper member 50 includes slot 80 that is formed between a pair of raised rail members 82 and 84. End portion 29 of hinge pin 28 is positioned within slot 80 such that flat surfaces 29A and 29B confront and/or abut or contact the perimetrical edge of slot 80. Hinge pin 28 has a pin member 86 that is lodged within a bore (not shown) in hinge pin 28 and is adjacent to end portion 29. Pin member 86 extends in a direction that is generally orthogonal to the axis of hinge pin 28. Pin member 86 has portion 88 and portion 90. Portion 88 is positioned between outer surface 51 of hinge pin keeper member 50 and raised rail member 82. Similarly, portion 90 is between outer surface 51 and raised rail member 84. Such a configuration allows hinge pin keeper member 50 to pivot outward in the direction of arrow 70 to an open position and simultaneously pull hinge pin 28 outward, or to pivot in the direction opposite arrow 70 to a closed position so as to push hinge pin 28 inward. Portions 88 and 90 of spring pin 86 contact raised rail members 82 and 84, respectively, and/or outer surface 51 as hinge pin keeper member 50 pivots in either direction. Since end portion 29 of hinge pin 28 is located in slot or space 80 and between raised rail members 82 and 84, hinge pin 28 does not impede in any way the movement of hinge pin keeper member 50. Flat surfaces 29A and 29B of hinge pin 28 maintain the orientation of pin member 86 thereby preventing pin member 86 from slipping free. Thus, spring pin member 86 achieves two functions. First, it provides a push-pull surface for hinge pin keeper member 50 to reposition hinge pin 28. Secondly, spring pin member 86 limits the movement of hinge pin 28 relative to hinge pin keeper member 50 to prevent hinge pin 28 from falling free of link body members 12 and 14. In a preferred embodiment, the outer surfaces of buttons 58 and 63 are bevelled so as to facilitate movement of hinge pin keeper members 50 and 52, respectively, when moving to an open configuration or a closed configuration. In a preferred embodiment, slot or space 80 has a predetermined length such that when hinge pin keeper member 50 is in a fully open position, locking button 58 is behind portion 57 of hinge pin keeper member 50 (see FIG. 2), and hinge pin keeper member 50 cannot extend further so as to prevent portion 57 from moving beyond locking pin 58. This same configuration also applies to locking pin 63 and the opposite side of hinge pin keeper member 50. The outward force exerted on locking buttons 58 and 63 by internal spring 64 is sufficient to hold hinge pin keeper member 50 in the open position until the user pushes upon hinge pin keeper member 50 in a direction that is opposite arrow 70 in order to position hinge pin keeper member 50 in the closed position.

Figures 4, 5:
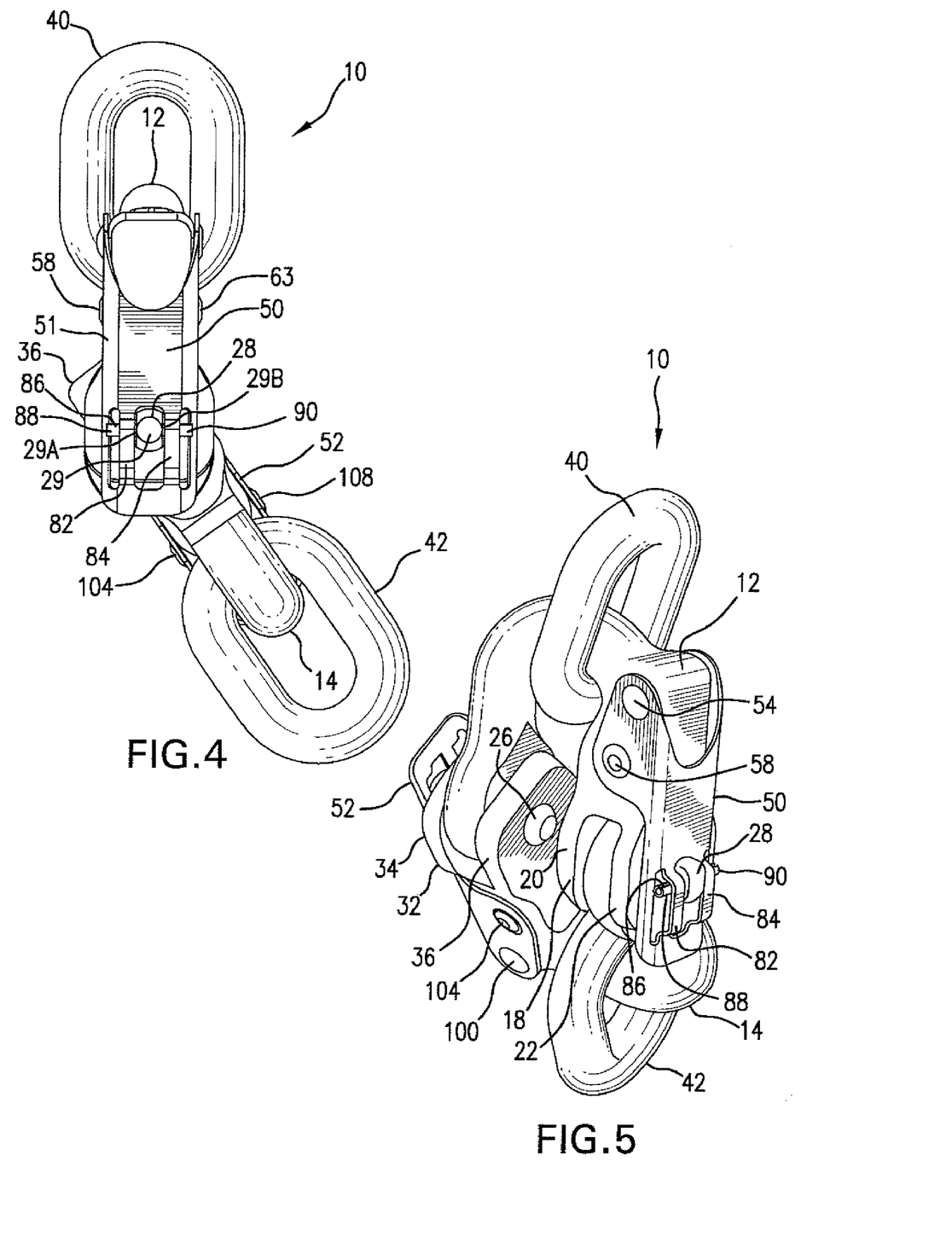
FIG. 4 is a side view, in elevation, illustrating the capability of one body member to pivot with respect to the other body member.
FIG. 5 is a perspective view illustrating the capability of one body member to pivot with respect to the other body member.

Referring to FIGS. 1 and 2, hinge pin keeper member 52 is pivotally attached to link body member 14 by two rivets, one of which being rivet 100 and the other rivet not being shown located on the other side of hinge pin keeper member 52. Hinge pin keeper member 52 has outer surface 53. Hinge pin keeper member 52 includes opening 102. Link body member 14 further comprises locking button 104 and a locking button cap member (not shown) that extends about locking button 104. This locking button cap member has the same structure and function as locking button cap member 59 described in the foregoing description. Locking button 104 and the locking button cap member are disposed within a bore (not shown) formed in body member 14 and which extends in a direction that is generally transverse to the axis of hinge pin 26. Hinge pin keeper member 52 also includes a second opening (not shown) on the opposite side of hinge pin keeper member 52 that is coaxial with opening 102 and sized to receive a second locking button 108 (see FIG. 4) that is located on the other side of body member 14 (see FIG. 4). Locking buttons 104 and 108 operate in the same manner as locking buttons 58 and 63, respectively, on link body member 12. Accordingly, link body member 14 includes an internal spring (not shown) in the bore of link body member 14 which urges locking buttons 104 and 108 outward such that locking button 104 protrudes into opening 102 and locking button 108 protrudes into the corresponding opening on the other side of hinge pin keeper member 52. In order to pivot hinge keeper member 52 outward in the direction indicated by arrow 110 (see FIG. 2) to an open position, a user depresses both locking buttons 104 and 108 and then pulls hinge keeper member 52 outward in the direction of arrow 110 to the open position. Hinge pin keeper member 52 includes a slot (not shown) and raised rail members, one of which being indicated by reference number 112, that have the same structure and purpose as slot 80 and raised rail members 82, 84, respectively, of hinge pin keeper member 50 described in the foregoing description. End portion 27 of hinge pin member 26 protrudes through the slot in hinge pin keeper member 52 as shown in FIG. 2. Hinge pin 26 has a spring pin member 114 that is lodged within a bore (not shown) and is adjacent to end portion 27. Spring pin member 114 extends in a direction that is generally orthogonal to the axis of hinge pin 26. The extending portions of spring pin member 114 are positioned between outer surface 53 of hinge pin keeper member 52 and the raised rail members (e.g. raised rail member 112) of hinge pin keeper member 52. As with hinge pin keeper member 50, hinge pin keeper member 52 can pivot outward in the direction of arrow 110 to the open position so as to pull hinge pin 26 outward, or pivot in the direction opposite arrow 110 to a closed position so as to push hinge pin 26 inward. The raised rail members (e.g. rail member 112) of hinge pin keeper member 52 contact the extending portions of spring pin member 114 and/or outer surface 53 as hinge pin keeper member 52 pivots in either direction. Since end portion 27 of hinge pin 26 is located in the slot (not shown) and between the raised rail members of hinge pin keeper member 52, hinge pin 26 does not impede in any way the movement of hinge pin keeper member 52. Flat surfaces 27A and 27B of hinge pin 26 maintain the orientation of spring pin member 114 thereby preventing pin member 114 from slipping free. Thus, spring pin member 114 achieves two functions. First, it provides a push-pull surface for hinge pin keeper member 52 to reposition hinge pin 26. Secondly, spring pin member 114 limits the movement of hinge pin 26 relative to hinge pin keeper member 52 to prevent hinge pin 26 from falling free of link body members 12 and 14. In a preferred embodiment, the outer surfaces of buttons 104 and 108 are bevelled so as to facilitate movement of hinge pin keeper members 50 and 52, respectively, when moving to an open configuration or a closed configuration. In a preferred embodiment, with respect to hinge pin keeper member 52, the slot or space (not shown but similar to slot 80) has a predetermined length such that when hinge pin keeper member 52 is in a fully open position, locking button 104 is behind portion 105 of hinge pin keeper member 52, and hinge pin keeper member 52 cannot extend further so as to prevent portion 105 from moving beyond locking button 104. This same configuration also applies to locking button 108 and the opposite side of hinge pin keeper member 52. The outward force on locking buttons 104 and 108 created by the internal spring within link body member 14 is sufficient to hold hinge pin keeper member 52 in the open position until the user pushes upon hinge pin keeper member 52 in a direction that is opposite arrow 110 in order to position hinge pin keeper member 52 in the closed position.

Referring to FIGS. 1, 2, 4 and 5, hinge pins 26 and 28 allow link body members 12 and 14 to pivot with respect to each other. In order to attach chain segments 40 and 42 to link body members 12 and 14, respectively, a user must first separate link body members 12 and 14 from each other. In order to accomplish this, the user depresses locking buttons 58 and 63 on hinge pin keeper member 50 and then pulls hinge pin keeper member 50 outward in the direction of arrow 70 to the open position in order to withdraw hinge pin 28. The user also depresses locking buttons 104 and 108 and then pulls hinge pin keeper member 52 outward in the direction of arrow 110 to the open position in order to withdraw hinge pin member 26. Once hinge pins 26 and 28 are withdrawn in this manner, link body members 12 and 14 can be separated. Chain segments 40 and 42 are then attached to link body members 12 and 14, respectively. Once chain segments 40 and 42 are attached to body members 12 and 14, respectively, the user then pushes hinge pin keeper members 50 and 52 inward so that hinge pins 28 and 26, respectively, are pushed inward. The user continues to push hinge pin keeper members 50 and 52 inward until the locking buttons 58, 63 and 104, 108 are completely positioned in the corresponding openings in hinge pin keeper members 50 and 52, respectively. Each link body member 12 and 14 is sized so that when chain segments 40 and 42 are attached, chain segment 40 can slide about on link body member 12 and chain segment 42 can slide about on link body member 14.

In a preferred embodiment, tool-less chain coupling link 10 of the present invention is fabricated from metals that exhibit and provide the require strength, integrity and durability.

Thus, the tool-less chain coupling link of the present invention provides many advantages and benefits. For example, only one person is required to separate link body members 12 and 14 from each other, attach the chains and then rejoin link body members 12 and 14 together. Furthermore, tools such as a hammer, punch, etc. are not required. In fact, no tools are required at all. Hinge pin keeper members 50 and 52 eliminate the need for tools. Furthermore, the tool-less chain coupling link of the present invention is sized such that it will provide equivalent axial loading as a chain link.

While the foregoing description is exemplary of the present invention, those of ordinary skill in the relevant arts will recognize the many variations, alterations, modifications, substitutions and the like are readily possible, especially in light of this description, the accompanying drawings and the claims drawn hereto. In any case, because the scope of the invention is much broader than any particular embodiment, the foregoing detailed description should not be construed as a limitation of the present invention, which is limited only by the claims appended hereto.

REFERENCE NUMBER LIST 10 tool-less chain coupling link
12 link body member
14 link body member
16 first end portion of link body member 12
18 second forked end portion of body member 12
20 section of forked end of second forked end portion
22 section of forked end of second forked end portion
24 space between sections 20 and 22
26 hinge pin
27 end portion of hinge pin 26
27A flat side portion of end portion 27
28 hinge pin
29 end portion of hinge pin 28
29A flat side of end portion of end portion 29
29B flat side of end portion of end portion 29
30 first end portion of link body member 14
32 second forked end portion of link body member 14
34 section of forked end portion 32
36 section of forked end portion 32
38 space between sections 34 and 36
40 chain segment
42 chain segment
50 hinge pin keeper member
51 exterior surface of hinge pin keeper member 50
52 hinge pin keeper member
53 exterior surface of hinge pin keeper member 52
54 rivet
56A opening in hinge pin keeper member 50
56B opening in hinge pin keeper member 50
57 portion of hinge pin keeper member 52 near opening 56
58 locking button
59 locking button cap member
60 opening of bore 61
61 bore in link body member 12
62 other opening of bore 61
63 locking button
64 internal spring located in bore 61
70 directional arrow
80 slot in hinge pin keeper member 50
82 raised rail member
84 raised rail member
86 spring pin lodged in hinge pin 28
88 extending portion of spring pin 86
90 extending portion of spring pin 86
100 rivet
102 opening in hinge pin keeper 52
104 locking button
105 portion of hinge pin keeper member 52 near opening 102
108 locking button
110 directional arrow
112 raised rail member
114 spring pin

What is claimed is:

1. A tool-less chain coupling link comprising:
a first link body member comprising a first end portion and a second forked end portion having a pair of sections separated by a space, said first end portion having an opening and each section of said second forked end portion having an opening;
a second link body member releasably joined to said first link body member, said second link body member having a first end portion and a second forked end portion having a pair of sections separated by a space, said first end portion of said second link body member having an opening and each section of said second forked end portion of said second link body member having an opening;
said first end portion of said first link body member being positioned in the space between the sections of the second forked end portion of said second link body member such that the openings in said first end portion of said first link body member are substantially aligned with said openings in said sections of said second forked end portion of said second link body member;
said first end portion of said second link body member being positioned in the space between the sections of the second forked end portion of said first link body member such that the openings in said first end portion of said second link body member are substantially aligned with said openings in said sections of said second forked end portion of said first link body member;
a first hinge pin removably inserted into the openings of said sections of said second forked end portion of said first link body member and said opening in said first end portion of said second link body member;
a first hinge pin keeper member pivotally attached to said first link body member and movably attached to said first hinge pin, said first hinge pin keeper member being pivotal to a first position to withdraw said first hinge pin from said openings in said sections of said second forked end portion of said first link body member and said opening in said first end section of said second link body member and to a second position that retains said first hinge pin within said opening of said first end portion of said second link body member and within said openings in said sections of said second forked end portion of said first link body member;
a second hinge pin member removably inserted into the openings of said sections of said second forked end portion of said second link body member and said opening in said first end portion of said first link body member;
a second hinge pin keeper member pivotally attached to said second link body member and movably attached to said second hinge pin, said second hinge pin keeper member being pivotal to a first position to withdraw said second hinge pin from said openings in said sections of said second forked end portion of said second link body member and from said opening in said first end section of said first link body member and to a second position that retains said second hinge pin within said opening of said first end portion of said first link body member and within said openings in said sections of said second forked end portion of said second link body member; and
wherein when said first and second hinge pin keeper members are both pivoted to said first position, said first and second hinge pins are withdrawn from said openings in said first and second body members to allow said first and second body members to be separated from each other.

2. The tool-less chain coupling link according to claim 1 wherein said first hinge pin keeper member has a first side having an opening formed therein and a second side having another opening formed therein.

3. The tool-less chain coupling link according to claim 2 wherein said first link body member further comprises a pair of locking buttons protruding from said first body portion and an internal spring member that urges each locking button outward, each locking button being sized to fit into a corresponding opening in said first hinge pin keeper member, said locking buttons having a first state and a second state, wherein when said locking buttons are configured to said first state, said first hinge pin keeper member can be pivoted to said first position to withdraw said first hinge pin, and wherein when said locking button is configured to said second state, said locking button retains said first hinge keeper member in said second position.

4. The tool-less chain coupling link according to claim 3 wherein said first link body member has a bore therein wherein said locking buttons protrude from bore and said internal spring is interposed between said locking buttons, said first link body member further including a locking button cap member to keep said locking buttons movably secured within said bore.

5. The tool-less chain coupling link according to claim 1 further comprising means for retaining said first hinge pin keeper member in second position and releasing said first hinge pin keeper member so it can be pivoted to said first position.

6. The tool-less chain coupling link according to claim 1 means for movably connecting said first hinge pin keeper member to said first hinge pin.

7. The tool-less chain coupling link according to claim 1 wherein said first hinge keeper member comprises a handle portion that has a slot formed therein and wherein said first hinge pin has an exposed end portion that is located within said slot, said handle portion being movably connected to said end portion of said first hinge keeper member.

8. The tool-less chain coupling link according to claim 7 wherein said exposed end portion of said first hinge pin has substantially flat sides.

9. The tool-less chain coupling link according to claim 8 wherein said first hinge pin includes a spring pin located in said exposed end portion and which is generally orthogonal to the axis of said first hinge pin, said spring pin having portions extending from both substantially flat sides of said first hinge pin.

10. The tool-less chain coupling link according to claim 9 wherein:
said handle portion has a pair of raised rail members, each raised rail member being located on either said of said slot;
said handle portion has an outer surface; and
said extending portions of said spring pin are located between said raised rail members and said outer surface of said handle portion.

11. The tool-less chain coupling link according to claim 1 wherein said second hinge pin keeper member has a first side having an opening formed therein and a second side having another opening formed therein.

12. The tool-less chain coupling link according to claim 11 wherein said second link body member further comprises a pair of locking buttons protruding from said second link body member and an internal spring member that urges each locking button outward, each locking button being sized to fit into a corresponding opening in said second hinge pin keeper member, said locking buttons having a first state and a second state, wherein when said locking buttons are configured to said first state, said second hinge pin keeper member can be pivoted to said second position to withdraw said second hinge pin, and wherein when said locking button is configured to said second state, said locking button retains said second hinge keeper member in said second position.

13. The tool-less chain coupling link according to claim 12 wherein said second body link body member has a bore therein wherein said locking buttons protrude from bore and said internal spring is interposed between said locking buttons, said second link body members further including a locking button cap member to keep said locking buttons movably secured within said bore of said second body link body member.

14. The tool-less chain coupling link according to claim 13 further comprising means for retaining said second hinge pin keeper member in second position and releasing said second hinge pin keeper member so it can be pivoted to said first position.

15. The tool-less chain coupling link according to claim 1 means for movably connecting said second hinge pin keeper member to said second hinge pin.

16. The tool-less chain coupling link according to claim 1 wherein said second hinge pin keeper member comprises a handle portion that has a slot formed therein and wherein said second hinge pin has an exposed end portion that is located within said slot, said handle portion being movably connected to said end portion of said second hinge pin.

17. The tool-less chain coupling link according to claim 16 wherein said exposed end portion of said second hinge pin has substantially flat sides.

18. The tool-less chain coupling link according to claim 17 wherein said second hinge pin includes a spring pin located in said exposed end portion, said spring pin being generally orthogonal to the axis of said second hinge pin, said spring pin having portions extending from both substantially flat sides of said second hinge pin.

19. The tool-less chain coupling link according to claim 18 wherein:
said handle portion has a pair of raised rail members, each raised rail member being located on either said of said slot;
said handle portion has an outer surface; and
said extending portions of said spring pin are located between said raised rail members and said outer surface of said handle portion.

20. The tool-less chain coupling link according to claim 1 wherein said first link body member is generally "U" shaped.

21. The tool-less chain coupling link according to claim 1 wherein said second link body member is generally "U" shaped.

22. A tool-less chain coupling link comprising:
a first generally U-shaped body member comprising a first end portion and a second forked end portion having a pair of sections separated by a space, said first end portion having an opening and each section of said second forked end portion having an opening;
a second generally U-shaped body member releasably joined to said first generally U-shaped body member, said second generally U-shaped body member comprising a first end portion and a second forked end portion having a pair of sections separated by a space, said first end portion of said second generally U-shaped body member having an opening and each section of said second forked end portion of said second generally U-shaped body member having an opening;
said first end portion of said first generally U-shaped body member being positioned in the space between the sections of the second forked end portion of said second generally U-shaped body member such that the openings in said first end portion of said first generally U-shaped body member are substantially aligned with said openings in said sections of said second forked end portion of said second generally U-shaped body member;

said first end portion of said second generally U-shaped body member being positioned in the space between the sections of the second forked end portion of said first generally U-shaped body member such that the openings in said first end portion of said second generally U-shaped body member are substantially aligned with said openings in said sections of said second forked end portion of said first generally U-shaped body member;

a first hinge pin removably inserted into the openings of said sections of said second forked end portion of said first generally U-shaped body member and said opening in said first end portion of said second generally U-shaped body member;

means for withdrawing said first hinge pin from said openings in said sections of said second forked end portion of said first generally U-shaped member and said openings in said first end section of said second generally U-shaped body member and for retaining said first hinge pin within said opening of said first end portion of said second generally U-shaped body member and within said openings in said sections of said second forked end portion of said first generally U-shaped member;

a second hinge pin member removably inserted into the openings of said sections of said second forked end portion of said second generally U-shaped body member and said opening in said first end portion of said first generally U-shaped body member;

means for withdrawing said second hinge pin from said openings in said sections of said second forked end portion of said second generally U-shaped member and from said openings in said first end section of said first generally U-shaped body member and for retaining said second hinge pin within said opening of said first end portion of said first generally U-shaped body member and within said openings in said sections of said second forked end portion of said second generally U-shaped member; and wherein when said first and second hinge pins are withdrawn, said first and second body members can be separated from each other to allow chain segments to be attached to said first and second body members.

* * * * *